United States Patent [19]

Hoffman

[11] Patent Number: 5,496,179
[45] Date of Patent: Mar. 5, 1996

[54] SYSTEM FOR TEACHING MUSIC READING

[76] Inventor: Christine Hoffman, 80 Whitson Rd., Huntington Station, N.Y. 11746

[21] Appl. No.: 94,230

[22] Filed: Jul. 21, 1993

[51] Int. Cl.$^6$ .................................................. G09B 15/02
[52] U.S. Cl. ........................................ 434/433; 84/479 A
[58] Field of Search ........................ 434/433; 84/470 R, 84/476, 477 R, 478, 479 A, 485 R

[56] References Cited

U.S. PATENT DOCUMENTS

| | | | |
|---|---|---|---|
| 1,114,139 | 10/1914 | Hoffman | 84/479 A |
| 1,201,769 | 10/1916 | Siegel | 84/478 X |
| 1,526,547 | 2/1925 | Hughey | 84/479 A X |
| 2,315,793 | 4/1943 | Jay | 84/476 |
| 2,807,183 | 9/1957 | Ney . | |
| 5,153,829 | 10/1992 | Furuya et al. | 84/477 R X |

FOREIGN PATENT DOCUMENTS

| | | | |
|---|---|---|---|
| 0163921 | of 1921 | United Kingdom | 84/479 A |
| 0385319 | of 1933 | United Kingdom | 84/478 |
| 1325262 | 8/1973 | United Kingdom | 84/479 A |

OTHER PUBLICATIONS

"Easy as A–B–C!", Popular Mechanics Advertising Section, Popular Mechanics (Magazine), Oct. 1924.
"I Can Read Music" by Nancy & Randall Faber; (C) 1992 pp. 6, 8, 10, 16, 20, 24 and 28.

Primary Examiner—Gene Mancene
Assistant Examiner—Jeffrey A. Smith
Attorney, Agent, or Firm—Nolte, Nolte and Hunter

[57] ABSTRACT

Musical notes in the form of representations of objects or creatures familiar to young children and which connote the name of a tone and are depicted on the musical staff and on instrumentalities which generate the tone.

10 Claims, 4 Drawing Sheets

SYSTEM FOR TEACHING MUSIC READING

The present invention relate to apparatuses and methods for teaching very young children to recognize the names and positions of musical notes on a staff and to correlate the notes with the keys, frets, valves, etc. of a musical instrument or representation thereof.

More particularly, the invention contemplates replacing the open or filled oval notes on the musical staff with pictorial presentations of objects or creatures which are readily recognized by children as young as three years of age and by persons having learning disabilities. These representations may also be oval or may follow the general shape of the object or creature being pictured. Similar depictions may be disposed on the control surfaces of a musical instrument; i,,e., the instrumentalities of a musical instrument which process the notes to their respective tones so that the child may immediately transpose knowledge of the notes the child has read to generating the tones.

The invention is of such a scope as to include card games, board games, programmed video games, schoolroom and library sheet and book materials and toys and puzzles incorporating the pictorial presentations of the invention representing musical notes and providing for noting, tallying or rewarding correct responses to or placement of the depicted notes; e.g., playing the notes; checking off the note or otherwise showing recognition of the note on a representation of a control surface or note processing instrumentality; placing a loose pictorial presentation in its correct position in, on or relative to a staff or the representation of a control surface or choosing the correct one of a multiple choice answer.

BACKGROUND OF THE INVENTION

Various musical teaching systems have been devised in the past. See for example, the following U.S. Pat. Nos.:

Featherstone, 555,213 (1886) refers to a game board and playing chips with music notes arranged upon staffs with music note fractions.

Hoffmann, 1,114,139 (1914) refers to a game wherein a series of cards each has a pictorial representation of one octave of the piano keyboard. A second series of cards each represents one of the keys of a piano and has representations thereon characteristic of the particular piano key which it represents. Poems and pictures are referred to.

Grant, 1,100,824 (1914) refers to a shiftable color chart for positioning colors at the keys of a keyboard. "Do" is blue, and the chart is shifted across the keyboard so that, for example in the key of D, the blue "do" falls up on the piano key "D".

Hughey, 1,526,547 (1925) refers to an instruction set using distinctive colors to represent the different tones in a musical scale. Apparently identical, except differently colored, birds are shown, both with notes and with corresponding color keyed keys.

Anthony, 2,788,697 (1953) refers to a musical toy for actuating a ball to jump upwardly in response to actuating a tone, thus indicating visually the note of the tone being sounded.

Meadows, 2,791,147 (1957) refers to music instruction devices with indicia 60, 65 showing a teacher the specific actuation of a key performed by student.

Ney, 2,807,183 (1957) refers to keys of a dummy color keyboard 10 with colors on keys 42, and colored with symbols 40 on a staff, for teaching music.

Johnston, (1957) 2,814,230 refers to a piano teaching device. A note on a scale is illuminated when a corresponding key is depressed.

Kaufman, 2,944,349 (1958) of general interest, referring to comparison between a scale or chart and other information.

Siegel, 3,256,765 (1966) refers to a representation of a portion of a piano keyboard having a light behind each note, a frame in which a clef card carrying the clef symbol and a key signature card carrying sharp and flat signatures may be arranged in various manners, together with a note card carrying columns of holes representing the position of notes on the written notation, and an electrical system which automatically illuminates the appropriate key when a contact probe is inserted in one of the holes.

Zegers-Ten Horn, 3,742,642 (1973) refers to tone producing means 19–26; a geometric configuration 11–18, relates to a basic tone of a musical scale and the sound of a bell.

Bennett, 4,056,999 (1977) refers to overlay segments secured to the white keys of a piano keyboard to define clefs, lines, and spaces.

Patty, 4,559,861 (1985) refers to movable markers 40, 41, 42, 43, 44 having colors or numbers, for a stringed instrument as device for expediting musical instruction.

Schoerkmayr, 4,730,533 (1988) refers to a plurality of optical display means on each of the keys, the display means indicating the sequence of the keys to be actuated, for use by less gifted people.

Rosenberg, 5,011,412 (1991) refers to a keyboard 10. Colored lights go on when a key is correctly inserted. Letter code 40 is on the front end of each key, for use as an educational device.

SUMMARY OF THE INVENTION

It is the general object of the invention to have young children and slow learners readily recognize a musical note from its familiar connotation rather than have them learn the note from an oval shape representing a letter of the alphabet. In this respect, familiar pictures will better hold the child's attention and in a pleasant way.

Most conventional musical instruments comprise a plurality of control surfaces or instrumentalities which process the notes to their respective tones. That is, each control surface generates the tone of a note of the musical scale of notes. For example, each key of a piano or organ keyboard comprises such a control surface. Depressing each surface generates a tone which corresponds to a note represented on the musical scale of notes on a staff.

In one aspect of the present invention there is provided a system for teaching very young children, to read the notes on sheet music and to correlate the notes with the control surfaces of a musical instrument, such as a keyboard, the fretted neck of a string instrument or the valves and openings of certain wind instruments.

As used herein, the term "control surface" shall include simulated non-functional control surfaces such as a surface with the representation of a key board or fretted neck imprinted thereon.

In one embodiment of the present invention, a series of different pictorial presentations of objects or creatures familiar to very young children is provided for attachment to the control surfaces. Each presentation corresponds to a note on the musical scale and is placed on the appropriate control surface or key. For example, a depiction of apple for the note A, a bug for B, a cat for C, a dog for D, an elephant for E, a fish for F, and a goat for G. These characters or representations may be affixed to the keys. Alternatively, decals may be provided for fixation to an existing musical instrument or representation thereof.

The apparatus is not limited to keyboards since the characters can be affixed to a fret board on a stringed instrument or on, at, or near the valves or apertures of a wind instrument.

The pictorial presentations are preferably substantially shaped in the form of an oval to look like the musical notes on a staff so that the cat note may be of the face of a cat with whiskers extending outside the oval shape. A car could also be used for the C note.

Pictorial notes in the forms of depictions corresponding to the pictorial notes on the control surfaces are placed in their proper positions upon the staff by printing if sheet music is being used to teach the child sight reading. The staff may be either in printed form, as just noted, as in sheet music, or depicted upon a video display screen. By highlighting each depiction on such a video display terminal the child can be led to depress the control surface; e.g., the key of the instrument having the corresponding depiction on it to generate the tone of the note. Sequencing the highlighting of depictions will lead the child through a melody.

Similarly, if the child follows the pictorial notes on the sheet music and "plays" the control surface having the corresponding pictorial notes, and does so in sequence, the child can play the melody from the staff. Importantly associations of the notes in the proper positions on the staff, with the correspondingly labeled positions on the keyboard, and with the tones generated by depressing each key, will create sufficient association in the child's brain that the child will be able to read sheet music and to play sheet music on the control surfaces of an instrument. A note, key position, and graphic representation on the scale will become firmly associated in the child's neural pathways.

DETAILED DESCRIPTION OF THE DRAWINGS

Figure 1:
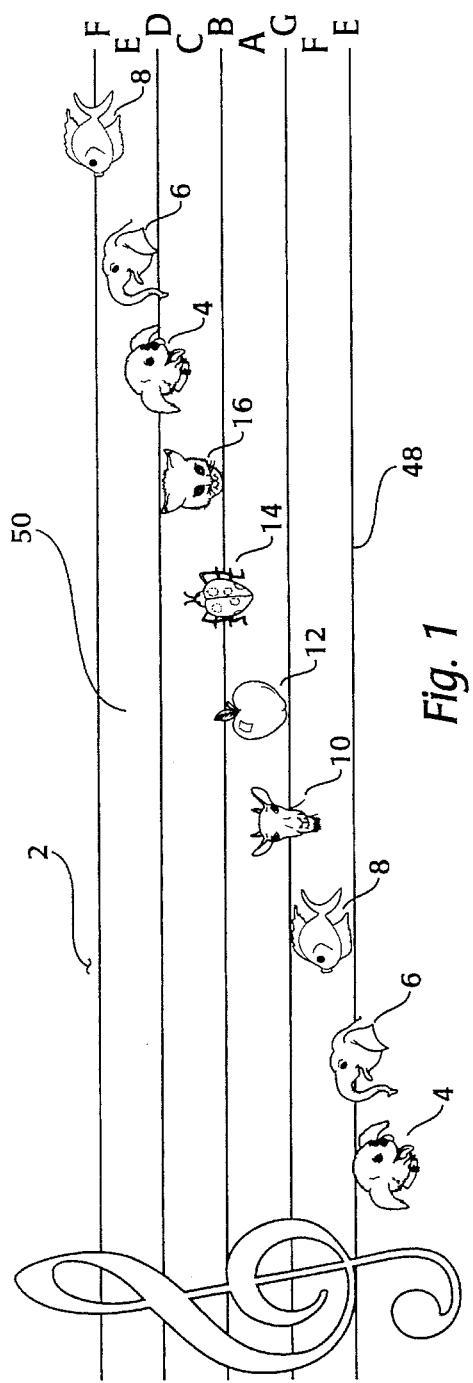
FIG. 1 is a frontal view of a musical staff with the notes A–G comprised of depictions of creatures readily recognized by very young children.

FIG. 1 shows a staff 2 on which differing visual representations of objects familiar to very young children, such as, for example, a dog 4, elephant 6, fish 8, goat 10, apple 12, bug 14 and cat 16 comprise the notes provided on the staff. Preferably, the name of each object begins with the letter of the note located on its proper position on the scale. The cat note could be a car or a carrot, the elephant an elf, the fish a fly, the goat a grasshopper, the apple an angel.

Figure 2:
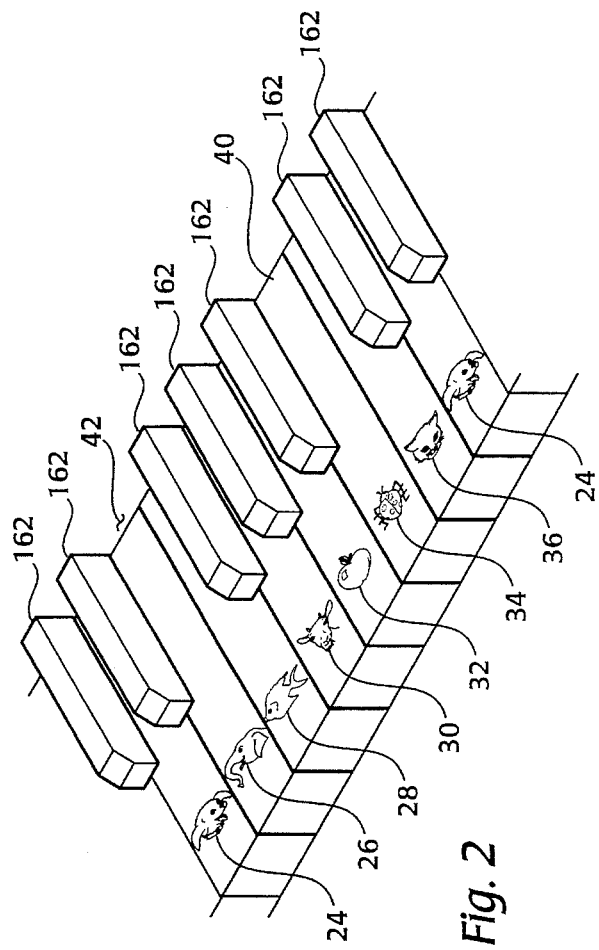
FIG. 2 is an perspective view of a piano keyboard partially broken away with depictions of the note creatures of FIG. 1 provided on the keys which generate the tones of the notes corresponding to the respective note creature.

In FIG. 2 the differing visual representations 24, 26, 28, 30, 32, 34, 36 of the same familiar creatures or objects are located on and affixed to keys 40 of a musical instrument keyboard 42. Each key 40 comprises a control surface which generates the tone of the depicted note.

Figure 3:
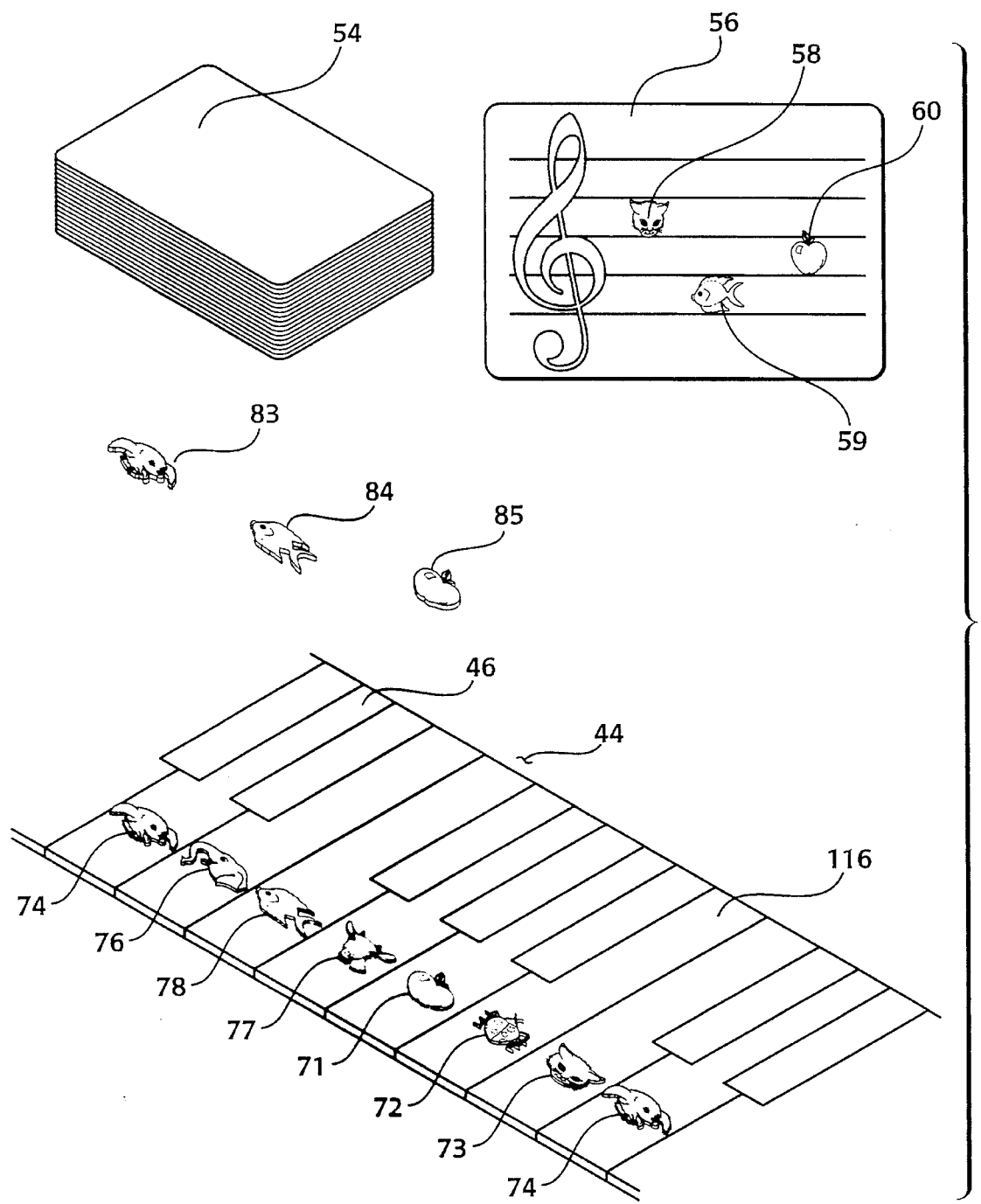
FIG. 3 is a perspective view of an assembly of parts comprising a game in which game pieces, similar to the creature notes of FIGS. 1 and 2 are formed and staff/note identification cards provide the problem for the student to solve by placing the creature notes on a key board or representation thereof.

In FIG. 3, a dummy keyboard 44 having non-functional control surfaces 46 may also be used.

The representation notes 24, 26, 30, 32, 34 and 36 on the keyboard 42 may be formed or presented as an integral part of the keyboard or they may be provided as decals for later affixation to any keyboard.

As can be appreciated, as the child observes the elephant 6 on the staff 2 and presses the key with the corresponding elephant 26 the child will learn to associate the position of the elephant note "E" on the E line 48 or E space 50 of the staff with keys on the piano having the same elephant notes.

This teaching technique may be done with various apparatuses including games.

In the game embodiment shown in FIG. 3 a stack 54 of cards is provided. The cards 56 have representation notes 58–60 properly disposed on a staff. In some cards a single note will be presented. In some, such as 56, a plurality of notes 58–60 will comprise a melody. Each of the notes comprises one of the representations of the familiar object or creature corresponding to that note on the keyboard and each of the notes is located upon the staff.

Each player in the game receives a representation of a keyboard 44 made of plastic or cardboard. The keyboard 44 contains representations 71, 72, 73, 74, 76, 77 and 78 in the appropriate places.

A plurality of note representations in the form of loose creature notes such as 83, 84 and 85 which are separable from the key board are also provided. The object of the game is for each player to take a card 56 and place a loose note, corresponding to the note or notes 58–60 on the card 56, upon the player's keyboard representation 44. The first player to complete the keyboard by placing corresponding objects, such as 83, 84 and 85, on the piano keys 46, wins.

Figure 4:
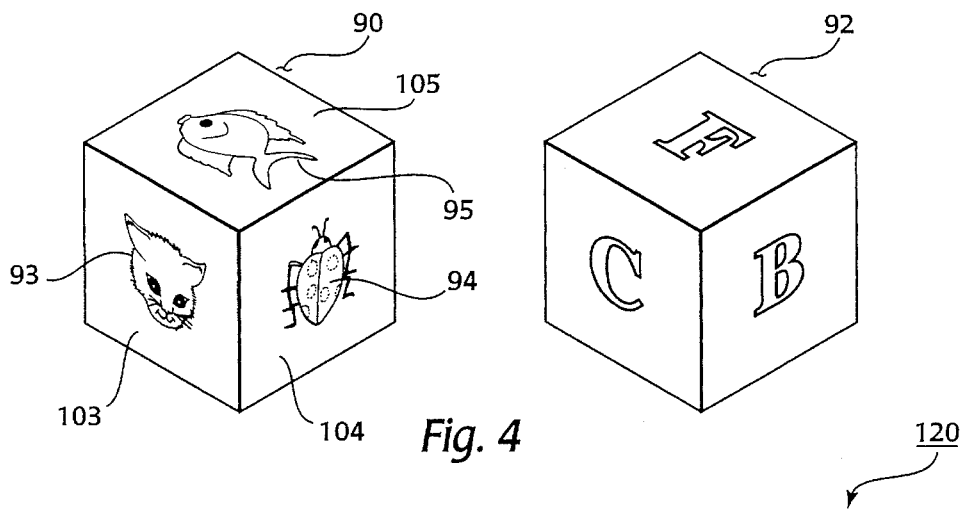
FIG. 4 is a perspective view of a pair of dice at least one of which has creature notes for chance identification by the child.

In a variation of this game (FIG. 4) a plurality of cubes 90, 92 or dice are provided. Instead of the usual dots, the cubes are provided with a note representation, such as 93–95, on each of their surfaces 103–105. The object is to throw the cube, observe the note representation 95 on die top 105, and place a puzzle part 86 (FIG. 3) on the child's keyboard 44 or a control surface 116 which, when played, would sound the tone of the corresponding note representation. Again the player who's keyboard 44, like a bingo card, is filled first wins, or if the game is played solo the game merely ends with the completion of the keyboard.

Figure 5:
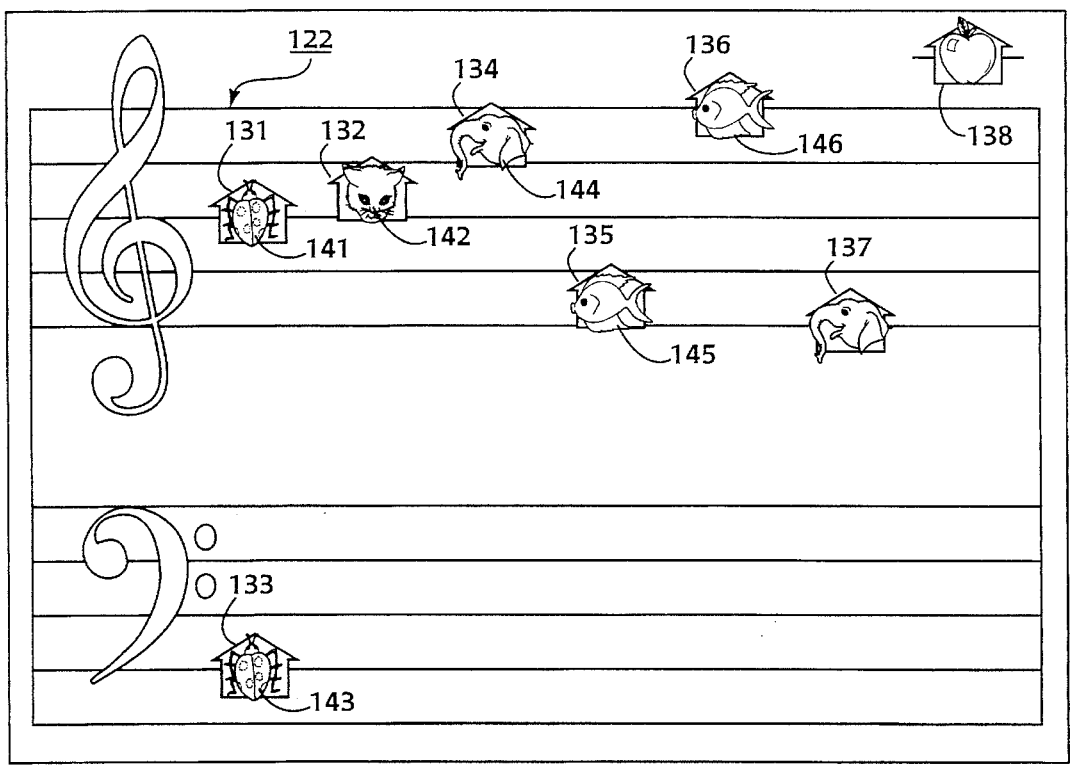
FIG. 5 is a frontal view of a playing surface of a playing card provided with "G" and "C" clef staffs on which are placed playing pieces incorporating creature notes.

In another variation (FIG. 5) each child is provided with his own card 120 containing a musical staff 122. The staff may have a plurality of two-dimensional depictions 131–138 of empty objects with which a creature or object note may be associated, such as houses 138, into which the note representations in the form of puzzle parts 141–146 148 which are separable from the staff may be appropriately placed. These houses 131–137 may be in a logical progression ascending up the scale, or may be dispersed in a melodious order as shown. The child who completes the scale, by placing the appropriate puzzle parts in the appropriate house locations, wins or completes the game.

Computer Programs

Program A

Figure 6:
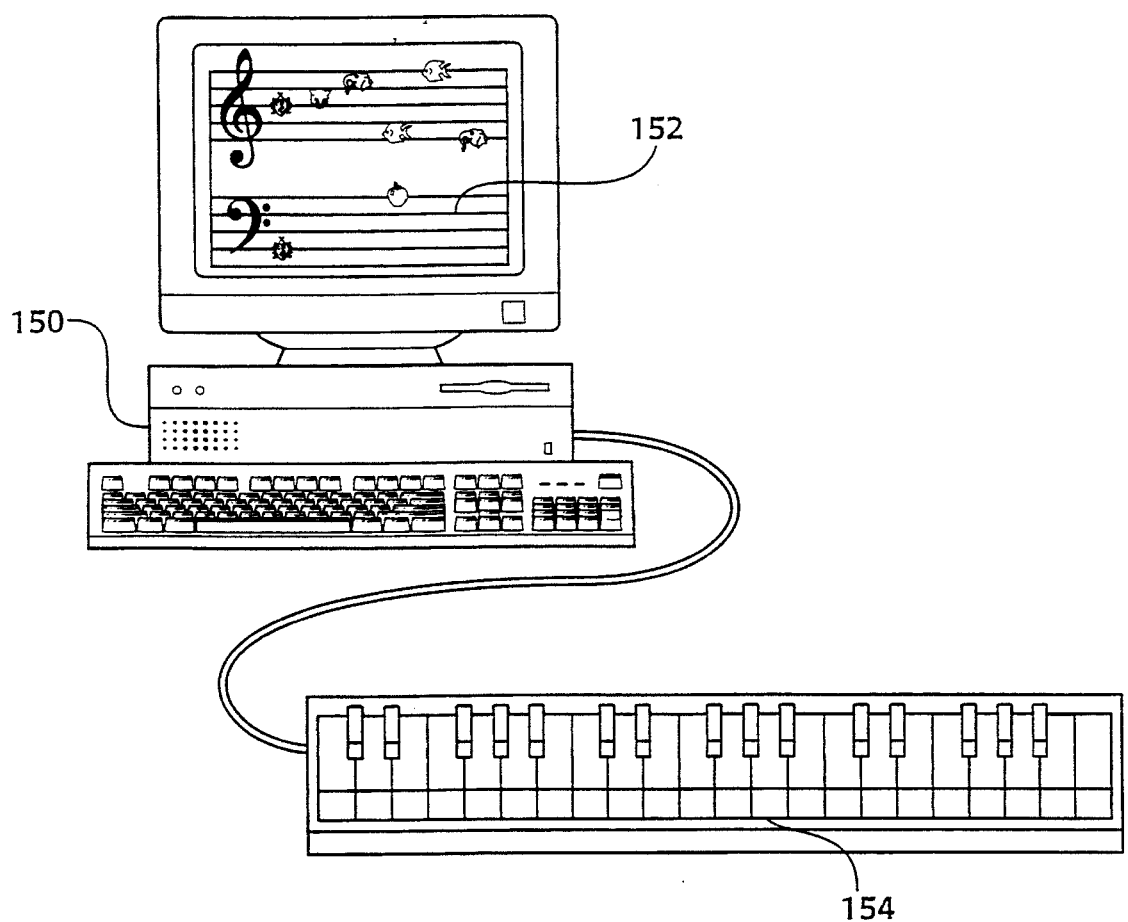
FIG. 6 is a frontal view of components of a computer programmed to display a musical staff incorporating notes formed in accordance with the invention.

As in FIG. 6, a computer 150, comprising a display such as CRT 152 and a musical interface, such as MIDI keyboard 154, can be used to teach beginning piano to young children and slow learners. This learning device aids a child by putting within his sight a new and improved representation of a musical language. As in FIG. 1 the representations 4, 6, 8, 10, 12, 14 and 16 of the notes help a child to connect the representations on the musical staff 2 with the corresponding representations 24, 26, 28, 30, 32, 34 and 36 (FIG. 2) on a piano-like keyboard 42 connected to the computer.

A preferred teaching process might be as follows:

1. A child is directed to play all black keys 162–167 on keyboard 42 starting at the low end. The child is directed to say, "1-2, 1-2-3," etc., as he plays, all the way up the keyboard 42.
2. The computer says "You're going to meet a friend on the keyboard. His name is Mr. Cat." Computer shows a cat shape on the musical staff. Computer says "Find Mr. Cat on your keyboard and ring his bell with your thumb".
3. (optional) Computer says "Notice Mr. Cat lives on one side of the group of three black keys. Now find all the Mr. Cats on the keyboard".
4. "Put Mr. Cat in his house on the keyboard."
5. Child puts a sticker house, sticker car, sticker soccer ball etc. around Mr. Cat on the keyboard.
6. Meet Mr. Dog, display Mr. Dog on the staff on the computer screen.
7. Ring his bell with your pointer finger.
8. (optional) Find all Mr. Dogs on the keyboard.
9. Meet Mr. Elephant. etc. Use middle finger
10. Meet Mr. Fish etc.
11. Meet Mr. Grasshopper etc.
12. Left hand next.

Program B

Children are now ready, for example, to ring all their new friends bells hopefully using correct hand position and fingers. A typical procedure might be to first "Ring their new friends bells". After this is successfully done, the sound may be changed to, for example, a beep. A similar exercise is performed with the beep sounds, followed by other exercises with other sounds. Eventually, the exercises play a melody.

I claim:

1. The combination of at least one first musical note constituted only by a representation of one of a three dimensional object and creature readily identifiable by a young child and including physical indicia constituting means connoting the alphabetical name of but one of the tones of the musical scale; with a musical staff in which said representation constituting said first musical note is on said staff occupying a position designated for said but one tone; and with one of a singular musical instrument having a plurality of instrumentalities which generate all of the tones of the musical scale including an instrumentality which generates said but one tone and a representation of said singular musical instrument including representations of instrumentalities which generate all of the tones of the musical scale including a representation of an instrumentality which generates said but one tone, and at least one second musical note which is a duplicate of said first mentioned musical note, said second musical note being constituted only by a representation of the same one of a three dimensional object and creature as said representation constituting said first musical note, readily identifiable by a young child and constituting means connoting the same musical tone as connoted by said representation constituting said first musical note, and said second musical note is on said instrumentality which generates said but one tone included in said one of said singular musical instrument and representation of said singular musical instrument, said combination constituting means for a young student to read said first musical note on said staff occupying said position designated for said but one tone and to play the tone connoted by said representation of one of said object and creature on said singular musical instrument or representation thereof.

2. The combination of claim 1 wherein said at least one first note constituted by said representation of one of an object and creature and said staff are printed on sheet music.

3. The combination of claim 1 wherein said representation constituting said first musical note is a device separable from said staff and is placed by choice on said staff in a position designated for said at least one tone.

4. The combination of claim 1 wherein said representation constituting said second musical note is a device separable from said one of said instrumentality which generates said note and representation of said instrumentality and is placed by choice on said one of said instrumentality and representation of said instrumentality.

5. The combination of claim 1 wherein at least one of said representations constituting at least one of said first and second musical notes is a device separable from one of said staff and said one of said instrumentality and representation of said instrumentality and is placed by choice on at least one of said staff and said one of said instrumentality and representation of said instrumentality.

6. The combination of claim 1 wherein at least one of said representations constituting one of said first and second musical notes is a decal.

7. The combination of claim 1 wherein at least one of said representations constituting one of said first and second musical notes is a depiction on a CRT generated by a program for displaying said representation.

8. The combination of claim 1 wherein at least one of said representations constituting said first and second musical notes is a cartoon face of an animal.

9. The combination of claim 1 further including a series of said first musical notes on said staff, each one of said musical notes constituted only by a representation of one of a three dimensional object and creature readily identifiable by a young child and constituting means connoting but one of the tones of the musical scale, each musical note of said series of musical notes constituted only by a different representation of a different one of a three dimensional object and creature and constituting means connoting a plurality of the tones of the musical scale; said representations of said series of said first musical notes occupying the respective positions on said staff designated for said plurality of tones.

10. The combination of claim 9 in further combination with one of a plurality of instrumentalities that generate said plurality of tones and a plurality of representations of said instrumentalities in said singular musical instrument, and including a series of said second musical notes and in which said representations of said series of said second musical notes are on respective ones of said one of said plurality of instrumentalities which generate the respective tones connoted by said respective representations and said plurality of representations of said instrumentalities.

* * * * *